(12) United States Patent
Wang et al.

(10) Patent No.: US 11,775,873 B2
(45) Date of Patent: Oct. 3, 2023

(54) MISSING VALUE IMPUTATION TECHNIQUE TO FACILITATE PROGNOSTIC ANALYSIS OF TIME-SERIES SENSOR DATA

(71) Applicant: Oracle International Corporation, Redwood Shores, CA (US)

(72) Inventors: Guang C. Wang, San Diego, CA (US); Kenny C. Gross, Escondido, CA (US); Dieter Gawlick, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1274 days.

(21) Appl. No.: 16/005,495

(22) Filed: Jun. 11, 2018

(65) Prior Publication Data

US 2019/0378022 A1    Dec. 12, 2019

(51) Int. Cl.
*G06N 20/10* (2019.01)
*G06N 5/04* (2023.01)
*G06N 20/00* (2019.01)
*G06F 17/18* (2006.01)
*G06F 17/17* (2006.01)
*G06F 18/214* (2023.01)

(52) U.S. Cl.
CPC .............. *G06N 20/10* (2019.01); *G06F 17/17* (2013.01); *G06F 17/18* (2013.01); *G06F 18/214* (2023.01); *G06N 5/04* (2013.01); *G06N 20/00* (2019.01)

(58) Field of Classification Search
CPC ........ G06N 5/04; G06N 20/00; G06N 99/005; G06F 17/17; G06F 17/18; G06F 16/215; G06K 9/6256; G05B 23/0221
See application file for complete search history.

(56) References Cited

U.S. PATENT DOCUMENTS

| | | | | |
|---|---|---|---|---|
| 6,609,036 B1* | 8/2003 | Bickford | .............. | G05B 23/024 |
| | | | | 700/30 |
| 2013/0318011 A1* | 11/2013 | Jones | ..................... | G05B 23/02 |
| | | | | 706/12 |
| 2019/0228291 A1* | 7/2019 | Kurasawa | ............... | G06F 17/16 |

OTHER PUBLICATIONS

Sabhnani, Maheshkumar, and Gursel Serpen. "Why machine learning algorithms fail in misuse detection on KDD intrusion detection data set." Intelligent data analysis 8.4 (2004): 403-415. (Year: 2004).*

(Continued)

*Primary Examiner* — Viker A Lamardo
(74) *Attorney, Agent, or Firm* — Park, Vaughan, Fleming & Dowler LLP (57) ABSTRACT

First, the system obtains time-series sensor data. Next, the system identifies missing values in the time-series sensor data, and fills in the missing values through interpolation. The system then divides the time-series sensor data into a training set and an estimation set. Next, the system trains an inferential model on the training set, and uses the inferential model to replace interpolated values in the estimation set with inferential estimates. If there exist interpolated values in the training set, the system switches the training and estimation sets. The system trains a new inferential model on the new training set, and uses the new inferential model to replace interpolated values in the new estimation set with inferential estimates. The system then switches back the training and estimation sets. Finally, the system combines the training and estimation sets to produce preprocessed time-series sensor data, wherein missing values are filled in with imputed values.

20 Claims, 4 Drawing Sheets

(56) References Cited

OTHER PUBLICATIONS

Sydney, F "Holdouts and Cross Validation: Why the Data Used to Evaluate your Model Matters" https://community.alteryx.com/t5/Data-Science/Holdouts-and-Cross-Validation-Why-the-Data-Used-to-Evaluate-your/ba-p/448982 (2019) (Year: 2019).*

Jingguang Zhou, Zili Huang, "Recover Missing Sensor Data with Iterative Imputing Network," arXiv:1711.07878v1 [cs.LG] Nov. 20, 2017 (Year: 2017).*

Bowden et al., "Data transformation for neural network models in water resources applications," Journal of Hydroinformatics, vol. 05.4 (Year: 2003).*

Bernard Herbst, "Sensibility Study for Optimizing the Classification of Remote Sensing Time Series," Master's Thesis, Lulea University of Technology (Year: 2007).*

* cited by examiner

|   | Ground Truth | Interp Value | Interp Residual | MSET Value | MSET Residual |
|---|---|---|---|---|---|
| 1 | 1.64 | 0.85 | 0.78 | 0.98 | 0.65 |
| 2 | 1.23 | -0.31 | 1.54 | 1.03 | 0.21 |
| 3 | -0.93 | -1.44 | 0.51 | -0.64 | -0.29 |
| 4 | 0.29 | 0.28 | 0.01 | 1.18 | -0.90 |
| 5 | 0.03 | -0.51 | 0.54 | -0.74 | 0.77 |
| 6 | -1.63 | -0.87 | -0.76 | -1.39 | -0.23 |
| 7 | -0.44 | -0.61 | 0.16 | 0.06 | -0.50 |
| 8 | 1.32 | 0.68 | 0.64 | 1.21 | 0.11 |
| 9 | -0.40 | 0.92 | -1.32 | 0.16 | -0.56 |
| 10 | -0.67 | 0.06 | -0.73 | -0.53 | -0.14 |
| 11 | -1.66 | -0.93 | -0.72 | -1.15 | -0.51 |
| 12 | 0.03 | 0.79 | -0.75 | 0.31 | -0.27 |
| 13 | 1.23 | 0.16 | 1.07 | 1.44 | -0.21 |
| Average Error | | | 0.73 | | 0.41 |

FIG. 4

MISSING VALUE IMPUTATION TECHNIQUE TO FACILITATE PROGNOSTIC ANALYSIS OF TIME-SERIES SENSOR DATA

BACKGROUND

Field

The disclosed embodiments generally relate to techniques for performing prognostic analysis operations based on time-series sensor data. More specifically, the disclosed embodiments relate to a missing value imputation technique, which fills in missing values in a training dataset to facilitate prognostics-analysis operations on subsequently received time-series sensor data from a system under surveillance.

Related Art

Enormous numbers of sensors are presently being deployed to monitor the operational health of critical assets in monitored systems. For example, a medium-sized computer data center can include over 1,000,000 sensors monitoring thousands of business-critical servers, a modern passenger jet can include 75,000 sensors, and an oil refinery can include over 1,000,000 sensors. These sensors produce large volumes of time-series data, which is typically stored in time-series databases.

Missing data values present a growing challenge for systems that monitor time-series data. With the large number of sensors that are currently present in monitored systems, it is not economically feasible to have all sensors individually wired to a data-acquisition system. Instead, sensor signals are typically digitized close to the locations of the physical sensors, and are then multiplexed and transmitted over a "signal bus" to a centralized data-acquisition system. Unfortunately, because of the large number of sensors and limited bus bandwidth, this signal bus can become intermittently saturated. This gives rise to missing data values on the receiving side, or alternatively to "stale values" because in some systems if a new "fresh" value for a signal is not available, the receiving side will simply repeat the last "fresh" received value.

Another reason for missing values is the recent proliferation of wireless sensors, which are become increasingly more common as the cost of wireless sensor systems has dropped below the cost of dense-sensor, wired data-acquisition systems. Note that wireless sensors have much greater missing-value rates than hard-wired sensors.

A final reason that missing values are becoming more common is that in some industries sensor data is now commonly transmitted via cellular networks. The problem with cellular networks is that up to 5% of the packets can be dropped. (This is because wireless system operators discovered years ago that up to 5% of packets can be dropped for voice calls without affecting people's ability to understand one another in phone conversations.)

However, in order to use prognostic-surveillance techniques to effectively monitor time-series sensor data, uniform time-series data streams are required, which means the missing values must be "filled in." The traditional approach to filling in such missing values is to use an interpolation scheme, which can be as simple as taking an average between the most-recent non-missing value and the next non-missing value. Alternatively, more-sophisticated interpolation schemes can be used, which ensure continuous first and second derivatives, or inverse Lagrangian interpolation schemes can be used when the timestamps for the observations are not exactly uniform. However, if an anomalous event occurs during a "blind spot" in the time-series data, which is filled in through interpolation, the anomalous event cannot be detected because no matter how cleverly one fills in the blind spot through interpolation, it still remains a blind spot.

Hence, what is needed is a technique for filling in missing values in time-series sensor data, which operates without the above-described shortcomings of existing interpolation techniques.

SUMMARY

The disclosed embodiments provide a system that preprocesses time-series sensor data by filling in missing values with corresponding imputed values. During operation, the system first obtains the time-series sensor data, which was gathered from sensors in a monitored system during operation of the monitored system. Next, the system identifies missing values in the time-series sensor data, and fills in the missing values through interpolation. The system then divides the time-series sensor data into a training set and an estimation set. Next, the system trains an inferential model on the training set, and uses the trained inferential model to replace interpolated values in the estimation set with corresponding inferential estimates. In cases where there exist interpolated values in the training set, the system switches the training and estimation sets to produce a new training set and a new estimation set. The system then trains the new inferential model on the new training set, and uses the new inferential model to replace interpolated values in the new estimation set with corresponding inferential estimates. The system then switches back the training and estimation sets. Finally, the system combines the training and estimation sets to produce preprocessed time-series sensor data, wherein missing values are filled in with imputed values.

In some embodiments, the inferential model is a multivariate state estimation technique (MSET) model. In these embodiments, using the inferential model to replace interpolated values in the estimation set with corresponding inferential estimates comprises: using the MSET model to produce MSET estimates for the estimation set; and replacing the interpolated values in the estimation set with corresponding MSET estimates.

In some embodiments, identifying the missing values comprises: converting timestamps in the time-series sensor data into corresponding time indices to produce a time array; subtracting each value in the time array from a preceding value to produce a difference array; and identifying the missing values by looking for jumps in the difference array.

In some embodiments, while dividing the time-series sensor data into the training set and the estimation set, the system selects a first half of the time-series sensor data to be the training set, and selects a second half of the time-series sensor data to be the estimation set.

In some embodiments, while dividing the time-series sensor data into the training set and the estimation set, the system first partitions the time-series sensor data into a set of windows. Next, the system selects a subset of alternating windows in the set of windows to be the training set, and selects a remaining subset of unselected alternating windows in the set of windows to be the estimation set.

In some embodiments, the system subsequently trains a prognostic inferential model for a prognostic pattern-recognition system based on the preprocessed time-series sensor data. During a subsequent surveillance mode for the prognostic pattern-recognition system, the system receives subsequently generated time-series sensor data from the monitored system. The system then uses the prognostic inferential model to generate estimated values for the subsequently generated time-series sensor data. Next, the system performs a pairwise differencing operation between actual values and the estimated values for the subsequently generated time-series sensor data to produce residuals. Finally, the system performs a sequential probability ratio test (SPRT) on the residuals to detect incipient anomalies that arise during operation of the monitored system.

In some embodiments, while receiving the subsequently generated time-series sensor data, the system preprocesses the subsequently generated time-series sensor data to fill in missing values with corresponding imputed values prior to using the prognostic inferential model to generate the estimated values for the subsequently generated time-series sensor data.

In some embodiments, while detecting the incipient anomalies, the system detects an impending failure of the monitored system, or a malicious-intrusion event in the monitored system.

In some embodiments, obtaining the time-series sensor data comprises: initially receiving the time-series sensor data during operation of the monitored system; storing the time-series sensor data in a time-series database; and subsequently retrieving the time-series sensor data from the time-series database.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a new missing value imputation (MVI) procedure, which leverages an advanced pattern-recognition technique (e.g., MSET) and uses a new two-phase procedure to achieve high-accuracy missing value imputation for time-series sensor data. This new procedure "fills in" missing values with highly accurate "estimates" (not interpolations) where the estimates are computed based on serial correlation, cross-correlation among signals that are not missing, and stochastic structure.

Empirical results demonstrate a more than 40% improvement in accuracy as compared with conventional interpolation-based approaches for filling in missing values. More importantly, the new MVI technique removes "prognostic blind spots," which enables prognostic-surveillance systems to respond to degradation that occurs through a wide range of degradation mechanisms, which have heretofore been impossible to detect using conventional interpolation-based schemes for filling in missing values in time-series sensor data.

Exemplary Prognostic-Surveillance System

The above-described MVI procedure can be used to facilitate downstream prognostic-surveillance operations involving the time-series signals from the sensors. Note that MSET is able to predict what each signal in a set of correlated time-series signals "should be" on the basis of learned correlation patterns. While analyzing new observations, MSET creates an "estimate" for each observation, and then compares this estimate with the corresponding real measured value using a binary hypothesis test called the Sequential Probability Ratio Test (SPRT) to detect anomalies associated with the new observations.

Figure 1:
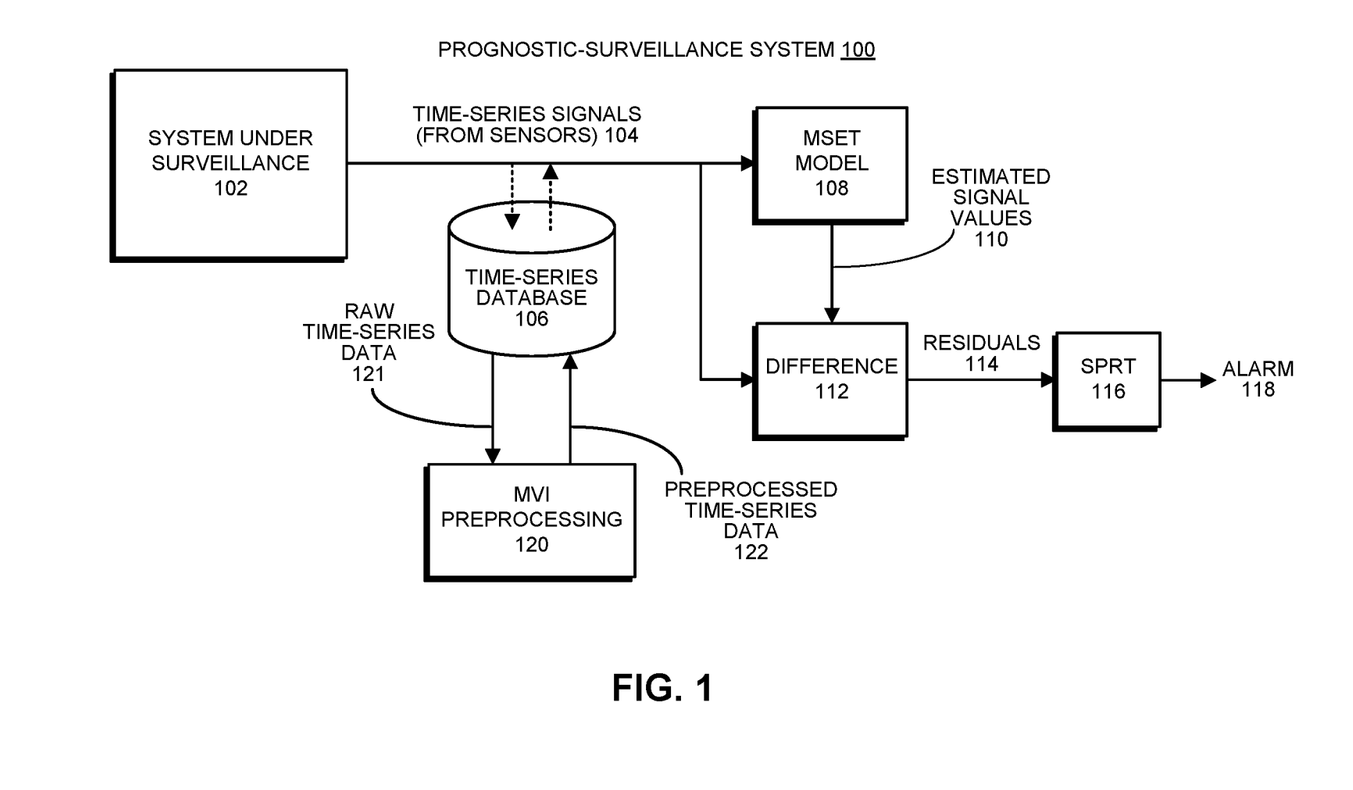
FIG. 1 illustrates an exemplary prognostic-surveillance system in accordance with the disclosed embodiments.

For example, FIG. 1 illustrates an exemplary prognostic-surveillance system 100 that makes use of a time-series database 106, which contains time-series signals obtained from sensors in accordance with the disclosed embodiments. As illustrated in FIG. 1, prognostic-surveillance system 100 operates on a set of time-series signals 104 obtained from sensors in a system under surveillance 102. Note that system under surveillance 102 can generally include any type of machinery or facility, which includes sensors and generates time-series signals. Moreover, time-series signals 104 can originate from any type of sensor, which can be located in a component in system under surveillance 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from system under surveillance 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." Annals of SMathematical Statistics. 16 (2): 117-186.) In this way, prognostic-surveillance system 100 can proactively alert system operators of incipient anomalies, such as impending failures, hopefully with enough lead time so that such problems can be avoided or proactively fixed.

Prognostic-surveillance system 100 also includes an MVI preprocessing module 120, which converts raw time-series signals 121 from time-series database 106 into corresponding preprocessed time-series signals 122, wherein missing values are filled in with imputed values through a new two-stage procedure, which is described in further detail below.

Two-Phase MVI Procedure

Many existing datasets contain "naturally occurring" missing values. However, these existing datasets are of no value for demonstrating the viability and accuracy attainable by the new MVI procedure, because it is impossible to compare the MVI estimates with the original value missing values, or to quantitatively compare the new MVI procedure with conventional interpolation.

So we instead use high-accuracy measured signals to serve as "ground truth" values. We then randomly select values to "make missing" through deletion. However, we retain the original high-accuracy measured values that were removed for subsequent evaluation of the new MVI procedure against conventional interpolation.

Note that models for MSET (and other machine-learning techniques) need to be "trained" before they can be used to estimate missing values. The standard procedure for training an MSET model is to divide the available data into a training dataset and an analysis dataset (also referred to as an "estimation dataset"). For example, one can arbitrarily select the first half of the available data for the training dataset, and the second half for the analysis dataset. Or, one can alternatively use the second half of the data for training and the first half for analysis. One can also divide the available data into an even number of windows, and then use alternating windows for training, and the other alternating windows for analysis.

A problem with the training process is that whatever mechanisms are causing missing values in the time-series data, it is just as likely that there will be missing values in the training dataset as in the analysis dataset. This is problematic, because it is not possible to train an MSET model (or another ML model) with a dataset possessing missing values, if the trained model is to be effectively applied to the analysis dataset to perform optimal MVI.

To overcome this problem, we introduce a new two-phase procedure. We start by detecting missing values in the training dataset and temporarily replacing the missing values with corresponding values computed through conventional interpolation. We then train an MSET model using the training dataset with the temporary interpolations. Next, we apply the trained MSET model to the analysis dataset to detect and replace missing values in the analysis dataset with MSET estimates. In the second phase of the procedure, we use the analysis dataset (with optimal MVI values inserted) to train another model, which is used to replace the temporary interpolations in the training dataset with MSET estimates.

Figure 4:
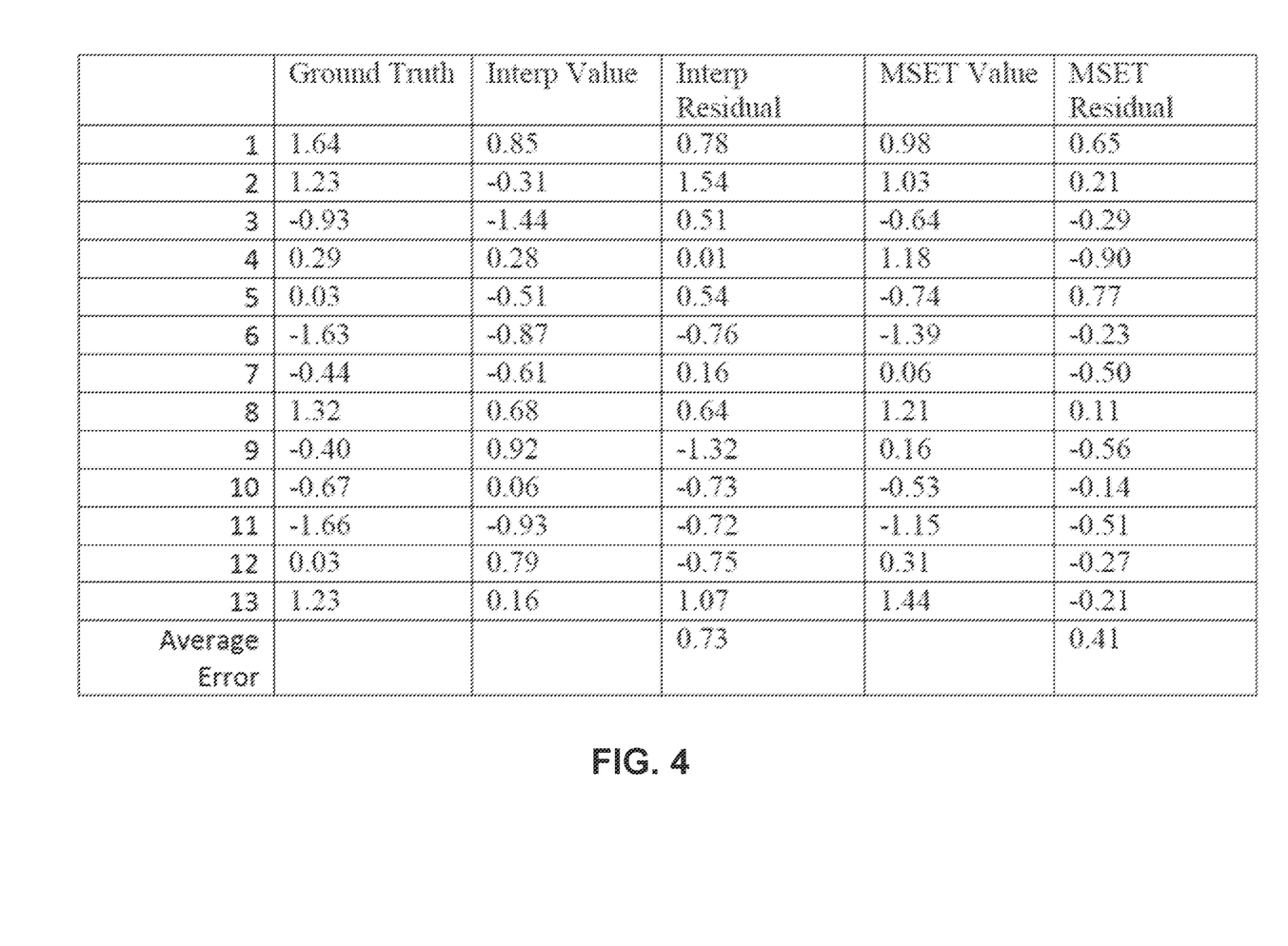
FIG. 4 compares the average uncertainty of the new MVI approach with the average uncertainty of conventional interpolation in accordance with the disclosed embodiments.

Table 1 compares the average uncertainty of the new MVI approach (0.41) with the average uncertainty of conventional interpolation (0.73), showing that for the analyzed set of time-series signals, the reduction in uncertainty by the new MVI approach is 44%. We tested this new MVI procedure on many datasets with varying degrees of cross-correlation and varying signal-to-noise ratios, and the corresponding results indicate a reduction in uncertainty of between 39 to 51%.

The value of the new MVI procedure is not just that the imputed missing values are significantly more accurate than what conventional interpolation can achieve. The value also arises from the fact that if a degradation condition occurs during a time window in which a missing value occurs, the MVI estimate will reflect the degradation condition, whereas a conventional interpolated value will not. This is because MVI estimates incorporate information from other correlated variables, which are not missing. In contrast, conventional interpolation techniques fill in a blind spot using an interpolation function that has no "knowledge" of a degradation condition that arises during the blind spot.

Missing Value Imputation Process

Figure 2:
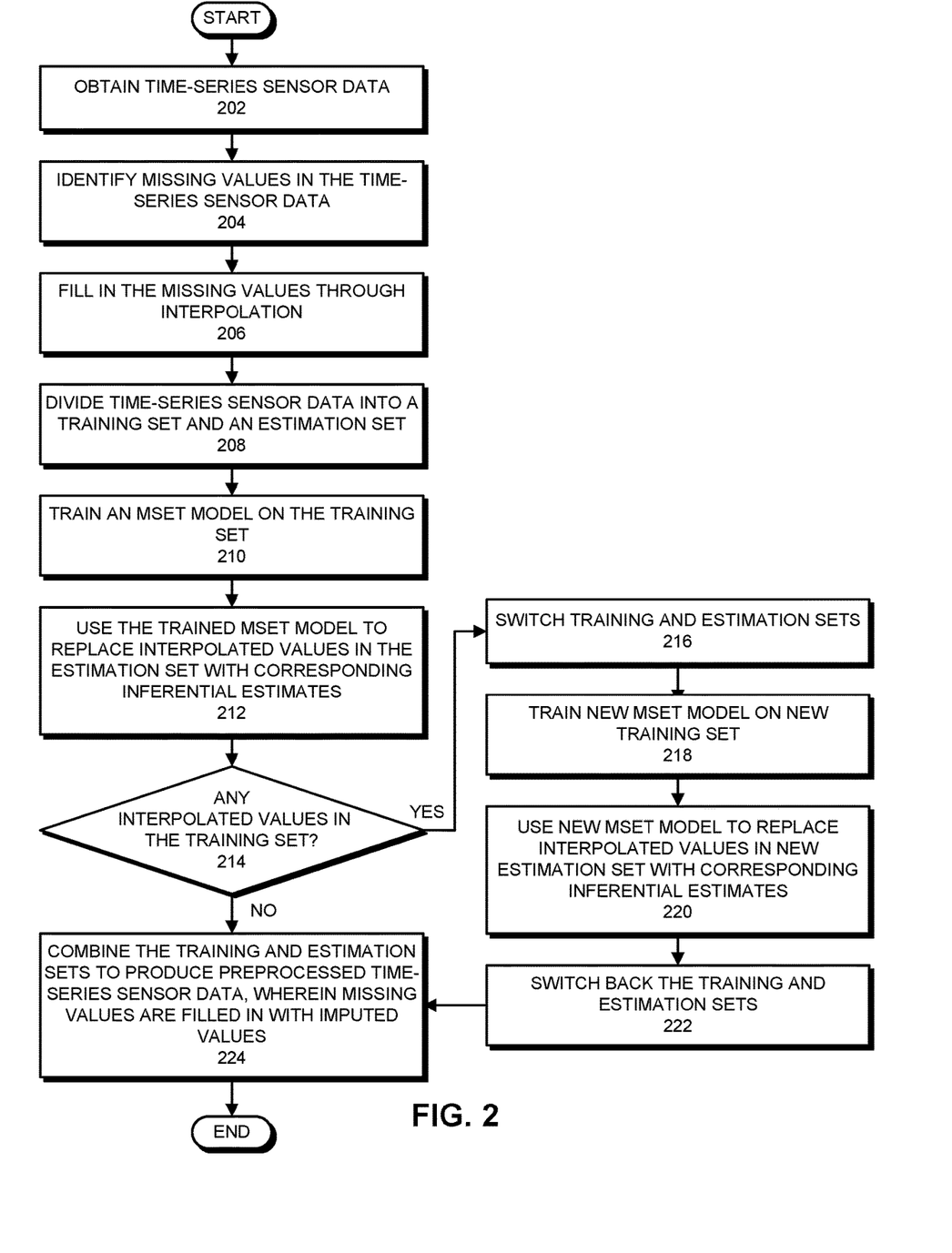
FIG. 2 presents a flow chart for the MVI process in accordance with the disclosed embodiments.

FIG. 2 presents a flow chart illustrating the MVI process in accordance with the disclosed embodiments. During operation, the system first obtains the time-series sensor data (step 202), which was gathered from sensors in a monitored system during operation of the monitored system. Next, the system identifies missing values in the time-series sensor data (step 204), and fills in the missing values through interpolation (step 206). The system then divides the time-series sensor data into a training set and an estimation set (step 208). Next, the system trains an MSET model on the training set (step 210), and uses the trained MSET model to replace interpolated values in the estimation set with corresponding inferential estimates (step 212). The system then determines whether there are any interpolated values in the training set (step 214). If so (YES at step 214), the system switches the training and estimation sets (step 216). The system then trains a new MSET model on the new training set (step 218), and uses the new MSET model to replace interpolated values in the new estimation set with corresponding inferential estimates (step 220). The system then switches back the training and estimation sets (step 222). Finally, the system combines the training and estimation sets to produce preprocessed time-series sensor data, wherein missing values are filled in with imputed values (step 224).

Figure 3:
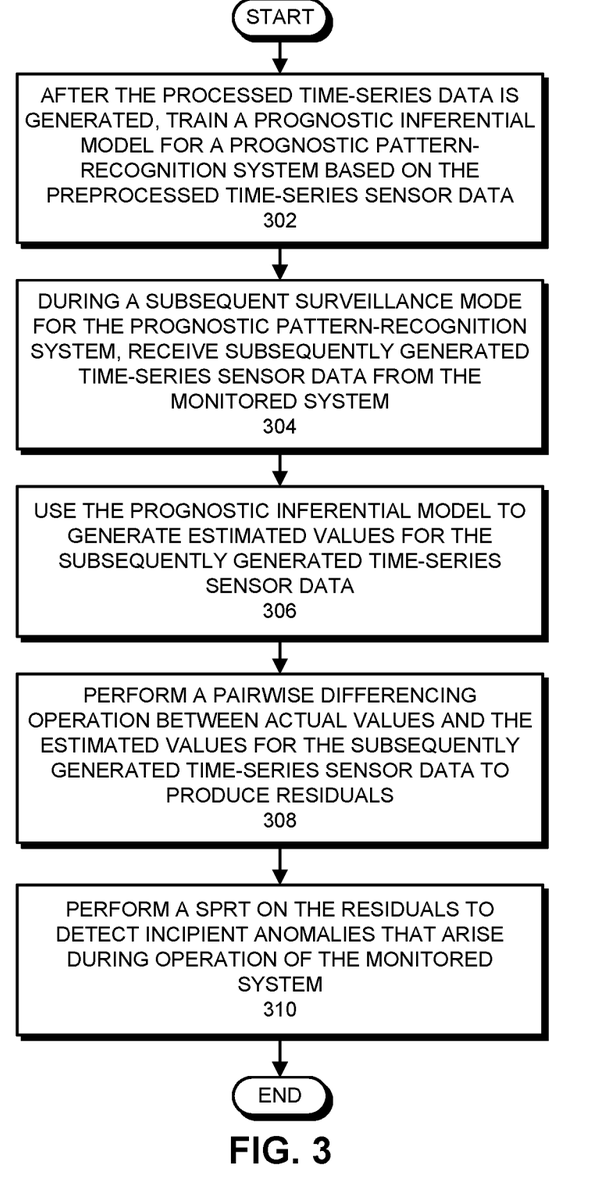
FIG. 3 presents a flow chart for the process of using the preprocessed time-series data to perform subsequent prognostic-surveillance operations in accordance with the disclosed embodiments.

FIG. 3 presents a flow chart illustrating the process of using the preprocessed time-series data to perform subsequent prognostic-surveillance operations in accordance with the disclosed embodiments. After the preprocessed time-series data is generated, the system trains a prognostic inferential model for a prognostic pattern-recognition system based on the preprocessed time-series sensor data (step 302). Next, during a subsequent surveillance mode for the prognostic pattern-recognition system, the system receives subsequently generated time-series sensor data from the monitored system (step 304). The system then uses the prognostic inferential model to generate estimated values for the subsequently generated time-series sensor data (step 306). Next, the system performs a pairwise differencing operation between actual values and the estimated values for the subsequently generated time-series sensor data to produce residuals (step 308). Finally, the system performs a sequential probability ratio test (SPRT) on the residuals to detect incipient anomalies that arise during operation of the monitored system (step 310).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for preprocessing time-series sensor data by filling in missing values with corresponding imputed values, comprising:
   obtaining the time-series sensor data, which was gathered from sensors in a monitored system during operation of the monitored system;
   identifying missing values in the time-series sensor data;
   filling in the missing values in the time-series sensor data with interpolated values through interpolation;
   dividing the time-series sensor data into a training set and an estimation set;
   training an inferential model on the training set;
   using the trained inferential model to generate inferential estimates for the missing values in the estimation set;
   replacing the interpolated values in the estimation set with the corresponding inferential estimates;
   determining whether the training set contains interpolated values;
   if the training set contains interpolated values:
      switching the training set and the estimation set to produce a new training set and a new estimation set;
      training a new inferential model based on the new training set;
      using the new inferential model to replace the interpolated values in the new estimation set with corresponding inferential estimates; and
      switching back the training set and the estimation set; and
   combining the training and estimation sets to produce preprocessed time-series sensor data, wherein missing values are filled in with imputed values.

2. The method of claim 1,
   wherein the inferential model is a multivariate state estimation technique (MSET) model; and
   wherein using the inferential model to replace interpolated values in the estimation set with corresponding inferential estimates comprises:
      using the MSET model to produce MSET estimates for the estimation set, and
      replacing the interpolated values in the estimation set with corresponding MSET estimates.

3. The method of claim 1, wherein identifying the missing values comprises:
   converting timestamps in the time-series sensor data into corresponding time indices to produce a time array;
   subtracting each value in the time array from a preceding value to produce a difference array; and
   identifying the missing values by looking for jumps in the difference array.

4. The method of claim 1, wherein dividing the time-series sensor data into the training set and the estimation set comprises:
   selecting a first half of the time-series sensor data to be the training set; and
   selecting a second half of the time-series sensor data to be the estimation set.

5. The method of claim 1, wherein dividing the time-series sensor data into the training set and the estimation set comprises:
   partitioning the time-series sensor data into a set of windows;
   selecting a subset of alternating windows in the set of windows to be the training set; and
   selecting a remaining subset of unselected alternating windows in the set of windows to be the estimation set.

6. The method of claim 1, wherein the method further comprises:
   training a prognostic inferential model for a prognostic pattern-recognition system based on the preprocessed time-series sensor data; and
   during a surveillance mode for the prognostic pattern-recognition system,
      receiving subsequently generated time-series sensor data from the monitored system,
      using the prognostic inferential model to generate estimated values for the subsequently generated time-series sensor data,
      performing a pairwise differencing operation between actual values and the estimated values for the subsequently generated time-series sensor data to produce residuals, and
      performing a sequential probability ratio test (SPRT) on the residuals to detect incipient anomalies that arise during operation of the monitored system.

7. The method of claim 6, wherein receiving the subsequently generated time-series sensor data involves preprocessing the subsequently generated time-series sensor data to fill in missing values with corresponding imputed values prior to using the prognostic inferential model to generate the estimated values for the subsequently generated time-series sensor data.

8. The method of claim 6, wherein detecting the incipient anomalies comprises detecting one or more of the following:
   an impending failure of the monitored system; and
   a malicious-intrusion event in the monitored system.

9. The method of claim 1, wherein obtaining the time-series sensor data comprises:
  initially receiving the time-series sensor data during operation of the monitored system;
  storing the time-series sensor data in a time-series database; and
  subsequently retrieving the time-series sensor data from the time-series database.

10. A non-transitory, computer-readable storage medium storing instructions that when executed by a computer cause the computer to perform a method for preprocessing time-series sensor data by filling in missing values with corresponding imputed values, the method comprising:
  obtaining the time-series sensor data, which was gathered from sensors in a monitored system during operation of the monitored system;
  identifying missing values in the time-series sensor data;
  filling in the missing values in the time-series sensor data with interpolated values through interpolation;
  dividing the time-series sensor data into a training set and an estimation set;
  training an inferential model on the training set;
  using the trained inferential model to generate inferential estimates for the missing values in the estimation set;
  replacing the interpolated values in the estimation set with the corresponding inferential estimates;
  determining whether the training set contains interpolated values;
  if the training set contains interpolated values:
    switching the training and the estimation sets to produce a new training set and a new estimation set;
    training a new inferential model based on the new training set;
    using the new inferential model to replace the interpolated values in the new estimation set with corresponding inferential estimates; and
    switching back the training and the estimation sets; and
  combining the training and estimation sets to produce preprocessed time-series sensor data, wherein missing values are filled in with imputed values.

11. The non-transitory, computer-readable storage medium of claim 10,
  wherein the inferential model is a multivariate state estimation technique (MSET) model; and
  wherein using the inferential model to replace interpolated values in the estimation set with corresponding inferential estimates comprises:
    using the MSET model to produce MSET estimates for the estimation set, and
    replacing the interpolated values in the estimation set with corresponding MSET estimates.

12. The non-transitory, computer-readable storage medium of claim 10, wherein identifying the missing values comprises:
  converting timestamps in the time-series sensor data into corresponding time indices to produce a time array;
  subtracting each value in the time array from a preceding value to produce a difference array; and
  identifying the missing values by looking for jumps in the difference array.

13. The non-transitory, computer-readable storage medium of claim 10, wherein dividing the time-series sensor data into the training set and the estimation set comprises:
  selecting a first half of the time-series sensor data to be the training set; and
  selecting a second half of the time-series sensor data to be the estimation set.

14. The non-transitory, computer-readable storage medium of claim 10, wherein dividing the time-series sensor data into the training set and the estimation set comprises:
  partitioning the time-series sensor data into a set of windows;
  selecting a subset of alternating windows in the set of windows to be the training set; and
  selecting a remaining subset of unselected alternating windows in the set of windows to be the estimation set.

15. The non-transitory, computer-readable storage medium of claim 10, wherein the method further comprises:
  training a prognostic inferential model for a prognostic pattern-recognition system based on the preprocessed time-series sensor data; and
  during a surveillance mode for the prognostic pattern-recognition system,
    receiving subsequently generated time-series sensor data from the monitored system,
    using the prognostic inferential model to generate estimated values for the subsequently generated time-series sensor data,
    performing a pairwise differencing operation between actual values and the estimated values for the subsequently generated time-series sensor data to produce residuals, and
    performing a sequential probability ratio test (SPRT) on the residuals to detect incipient anomalies that arise during operation of the monitored system.

16. The non-transitory, computer-readable storage medium of claim 15, wherein receiving the subsequently generated time-series sensor data involves preprocessing the subsequently generated time-series sensor data to fill in missing values with corresponding imputed values prior to using the prognostic inferential model to generate the estimated values for the subsequently generated time-series sensor data.

17. The non-transitory, computer-readable storage medium of claim 15, wherein detecting the incipient anomalies comprises detecting one or more of the following:
  an impending failure of the monitored system; and
  a malicious-intrusion event in the monitored system.

18. The non-transitory, computer-readable storage medium of claim 10, wherein obtaining the time-series sensor data comprises:
  initially receiving the time-series sensor data during operation of the monitored system;
  storing the time-series sensor data in a time-series database; and
  subsequently retrieving the time-series sensor data from the time-series database.

19. A system that preprocesses time-series sensor data by filling in missing values with corresponding imputed values, comprising:
  at least one processor and at least one associated memory; and
  a preprocessor that executes on the at least one processor, wherein during operation, the preprocessor:
    obtains the time-series sensor data, which was gathered from sensors in a monitored system during operation of the monitored system;
    identifies missing values in the time-series sensor data;
    fills in the missing values in the time-series sensor data with interpolated values through interpolation;
    divides the time-series sensor data into a training set and an estimation set;

trains an inferential model on the training set;
uses the trained inferential model to generate inferential estimates for the missing values in the estimation set;
replaces the interpolated values in the estimation set with the corresponding inferential estimates;
determines whether the training set contains interpolated values;
if the training set contains interpolated values:
- switches the training set and the estimation set to produce a new training set and a new estimation set;
- trains a new inferential model based on the new training set;
- uses the new inferential model to replace the interpolated values in the new estimation set with corresponding inferential estimates; and
- switches back the training set and the estimation set; and combines the training and estimation sets to produce preprocessed time-series sensor data, wherein missing values are filled in with imputed values.

20. The system of claim 19,
wherein the inferential model is a multivariate state estimation technique (MSET) model; and
wherein while using the inferential model to replace interpolated values in the estimation set with corresponding inferential estimates, the preprocessor:
uses the MSET model to produce MSET estimates for the estimation set, and
replaces the interpolated values in the estimation set with corresponding MSET estimates.

* * * * *